US008649499B1

(12) United States Patent
Koster et al.

(10) Patent No.: US 8,649,499 B1
(45) Date of Patent: Feb. 11, 2014

(54) COMMUNICATION ANALYTICS TRAINING MANAGEMENT SYSTEM FOR CALL CENTER AGENTS

(71) Applicant: Noble Systems Corporation, Atlanta, GA (US)

(72) Inventors: Karl H. Koster, Sandy Springs, GA (US); Christopher S. Haggerty, Atlanta, GA (US)

(73) Assignee: Noble Systems Corporation (*) Notice: Subject to any disclaimer, the term of this patent is extended or adjusted under 35 U.S.C. 154(b) by 0 days.

(21) Appl. No.: 13/678,759

(22) Filed: Nov. 16, 2012

(51) Int. Cl.
H04M 3/00 (2006.01)
H04M 5/00 (2006.01)

(52) U.S. Cl.
USPC .................. 379/265.06; 379/265.07

(58) Field of Classification Search
USPC ........... 379/265.01, 265.06, 265.07, 9
See application file for complete search history.

(56) References Cited

U.S. PATENT DOCUMENTS

| 5,239,460 | A | 8/1993 | LaRoche |
| 5,270,920 | A | 12/1993 | Pearse et al. |
| 5,483,444 | A | 1/1996 | Heintzeman et al. |
| 6,049,779 | A | 4/2000 | Berkson |
| 6,170,014 | B1 | 1/2001 | Darago et al. |
| 6,301,573 | B1 | 10/2001 | McIlwaine et al. |
| 6,324,282 | B1 | 11/2001 | McIllwaine et al. |
| 6,459,787 | B2 | 10/2002 | McIllwaine et al. |
| 6,628,777 | B1 | 9/2003 | McIllwaine et al. |
| 6,775,377 | B2 | 8/2004 | McIllwaine et al. |
| 7,043,193 | B1 | 5/2006 | Vashi et al. |
| 7,158,628 | B2 | 1/2007 | McConnell et al. |
| 7,174,010 | B2 | 2/2007 | McIlwaine et al. |
| 7,542,902 | B2 | 6/2009 | Scahill et al. |
| 7,660,407 | B2 | 2/2010 | Fama et al. |
| 7,672,845 | B2 * | 3/2010 | Beranek et al. ............... 704/251 |
| 7,801,055 | B1 | 9/2010 | Blair |
| 7,801,295 | B2 | 9/2010 | Patel et al. |
| 7,826,608 | B1 | 11/2010 | Peleg et al. |
| 8,094,790 | B2 * | 1/2012 | Conway et al. ............ 379/88.16 |
| 8,108,237 | B2 | 1/2012 | Bourne et al. |
| 8,112,306 | B2 | 2/2012 | Lyerly et al. |
| 8,117,064 | B2 | 2/2012 | Bourne et al. |
| 8,130,937 | B1 * | 3/2012 | Thenthiruperai et al. ....................... 379/266.02 |
| 8,402,070 | B2 | 3/2013 | Szlam et al. |
| 2004/0008828 | A1 | 1/2004 | Coles et al. |
| 2004/0165717 | A1 | 8/2004 | McIlwaine et al. |

(Continued)

OTHER PUBLICATIONS

Noble Systems Corporation, ShiftTrack Plus User Manual 5.5.0, Jun. 2010.

(Continued)

Primary Examiner — Ahmad Matar
Assistant Examiner — Nafiz E Hoque

(57) ABSTRACT

Technologies are generally presented herein pertaining to identifying a training topic for agents at a contact center. In various embodiments, these technologies comprise performing an analysis on communications conducted between agents at the contact center and contact parties over a time period. In particular embodiments, the analysis performed on the communications involves identifying a number of occurrences of a keyword or a keyphrase found in the communications between the agents and the contact parties. Further, in various embodiments, in response to the number of occurrences of the keyword or the keyphrase over the time period being more than a predetermined threshold, the technologies presented herein comprise automatically identifying a training topic associated with the keyword or the keyphrase, and then providing a training course to the agent.

15 Claims, 10 Drawing Sheets

(56) References Cited

U.S. PATENT DOCUMENTS

| | | |
|---|---|---|
| 2004/0202308 A1 | 10/2004 | Baggenstoss et al. |
| 2004/0202309 A1 | 10/2004 | Baggenstoss et al. |
| 2005/0010411 A1* | 1/2005 | Rigazio et al. ............... 704/246 |
| 2005/0175971 A1 | 8/2005 | Mcilwaine et al. |
| 2006/0002538 A1 | 1/2006 | Dezonno |
| 2006/0072739 A1 | 4/2006 | Baggenstoss et al. |
| 2006/0111953 A1 | 5/2006 | Setya |
| 2006/0182258 A1 | 8/2006 | Sisselman et al. |
| 2006/0233346 A1 | 10/2006 | McIlwaine et al. |
| 2006/0256953 A1 | 11/2006 | Pulaski et al. |
| 2006/0256954 A1 | 11/2006 | Patel et al. |
| 2007/0088563 A1 | 4/2007 | Nardotti et al. |
| 2007/0111180 A1 | 5/2007 | Sperle et al. |
| 2007/0127689 A1 | 6/2007 | McIlwaine et al. |
| 2007/0195944 A1 | 8/2007 | Korenblit et al. |
| 2007/0195945 A1 | 8/2007 | Korenblit et al. |
| 2007/0198322 A1 | 8/2007 | Bourne et al. |
| 2007/0198325 A1 | 8/2007 | Lyerly et al. |
| 2007/0198330 A1 | 8/2007 | Korenblit et al. |
| 2007/0206768 A1* | 9/2007 | Bourne et al. ........... 379/265.01 |
| 2010/0057493 A1 | 3/2010 | Heckelman |
| 2010/0104086 A1* | 4/2010 | Park ........................ 379/265.09 |
| 2010/0138411 A1 | 6/2010 | Judy et al. |
| 2011/0033036 A1 | 2/2011 | Edwards et al. |
| 2011/0055100 A1 | 3/2011 | Perreault et al. |
| 2011/0106566 A1 | 5/2011 | Levins |
| 2011/0125499 A1 | 5/2011 | Griggs et al. |

OTHER PUBLICATIONS

Noble Systems Corporation, NobleWFM 2010.0.0 User Guide, Mar. 28, 2011, 324 pages, Atlanta, GA.

Final Office Action Received for U.S. Appl. No 13/624,023 dated May 8, 2013.

Non-Final Office Action Received for U.S. Appl. No. 13/624,023 dated Jan. 18, 2013.

Notice of Allowance Received for U.S. Appl. No. 13/624,023 dated Jun. 11, 2013.

* cited by examiner

| Agent | Information Category | | | |
|---|---|---|---|---|
| 1 | A | C | B | D |
| 2 | C | B | A | |
| 3 | D | C | B | |
| 4 | E | C | B | |
| 5 | A | B | | |
| 6 | C | E | D | |
| 7 | C | B | D | |

FIG. 9A

| Category | Occurrences | Times Last |
|---|---|---|
| A | 3 | 1 |
| B | 6 | 4 |
| C | 6 | 0 |
| D | 3 | 3 |
| E | 1 | 0 |

FIG. 9B

COMMUNICATION ANALYTICS TRAINING MANAGEMENT SYSTEM FOR CALL CENTER AGENTS

CROSS-REFERENCE TO RELATED APPLICATIONS

The present application is related to U.S. patent application Ser. No. 13/624,023 filed Sep. 21, 2012, entitled "Learning Management System for Call Center Agents," and U.S. patent application Ser. No. 13/666,546 filed Nov. 1, 2012, entitled "Incentive-Based Training Management System for Call Center Agents," the contents of which are incorporated by reference in their entirety into the present application.

BACKGROUND

Call centers often employ a number of agents for handling inbound and outbound communications. The nature and purpose of the communications may vary greatly. For example, outbound calling campaigns may involve originating calls to collect debts, solicit donations for a non-profit organization, or offer new products for sale. Agents assigned to these campaigns must be familiar with the appropriate debt collection practices, the non-profit organization for which donations are sought, or the products being offered for sale. These same agents may also be involved in handling inbound communications and may be required to answer questions associated with various products, customers seeking service, etc. Thus, in many instances, agents must be trained in a variety of areas, including: operating the call center computer workstations, interacting with customer information systems, product features, or the guidelines and policies associated with a telemarketing campaign. Thus, training of the agents is important since training typically increases their effectiveness.

With that said, even within a workday, call center agents may be required to handle a number of different topics and/or issues with respect to fielding communications. For example, a particular agent may be providing support services for a computer manufacturer. For any given day, the agent may be required to handle communications involving a number of different issues such as, for example, hard drive issues involving computers sold by the manufacturer and issues involving installing various software packages on the computers. Furthermore, different topics and/or issues may trend over time so that agents are required to handle a particular topic and/or issue over a period of time that they may not have previously had to handle as frequently. For instance, returning to the example, the agent providing support services for the computer manufacturer may see a large increase in fielding communications involving installing software packages on the computers sold by the manufacturer because a software provider may have recently released a new software product that is being purchased by a number of the computer manufacturer's customers. In this instance, the computer manufacturer and/or call center may find it beneficial to provide "refresher" training to the agent so that the agent will be adequately prepared to handle the increased volume of communications with respect to installing software packages on the computer manufacturer's computers. Thus, the knowledge requirements and subsequent training for agents may change over time.

Accordingly, a need in the art exists to enable call centers to better recognize changes in call center agents' training requirements and to provide the appropriate training based on these changing requirements. Further, a need in the art exists to enable call centers to automate such a process to recognize changes is call center agents' training requirements and to provide the appropriate training based on these changing requirements. It is with respect to these considerations and others that the disclosure herein is presented.

BRIEF SUMMARY

Technologies are generally presented herein pertaining to identifying a training topic for at least one agent at a contact center. In various embodiments, these technologies comprise performing an analysis on communications conducted between agents at the contact center and contact parties over a time period. Depending on the embodiment, the communications may comprise one or more of telephone calls, text messages, emails, Web chats, and so forth.

In particular embodiments, the analysis performed on the communications involves identifying occurrences of a keyword or a keyphrase found in the communications between the agents and the contact parties. For instance, in one particular embodiment, the analysis performed on the communications involves identifying a number of occurrences of the keyword or the keyphrase over the time period for a predetermined number of the agents at the contact center.

Further, in various embodiments, in response to the occurrences of the keyword or the keyphrase over the time period being more than a predetermined threshold, the technologies presented herein comprise automatically identifying a training topic associated with the keyword or the keyphrase. In addition, as a result of identifying a training topic in particular embodiments, the technologies presented herein comprise automatically identifying one or more agents at the contact center to be scheduled for training on the identified training topic and automatically scheduling the one or more agents to receive training on the identified training topic.

In addition, in various embodiments, the technologies presented herein identify the training topic by determining a pattern for the communications conducted between the agents at the contact center and the contact parties over the time period. In particular embodiments, the pattern is based on one or more resolutions introduced during the communications conducted between the agents and the contact parties over the time period. Thus, the technologies presented herein for these particular embodiments identify the training topic based on the pattern, and the training topic is associated with at least one of the resolutions introduced during the communications conducted between the agents and the contact parties over the time period.

The technologies disclosed herein may be implemented as a computer-controlled apparatus, a method of operation, a computer process, a computing system, or as an article of manufacture such as a computer-readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIGS. 9A and 9B illustrate an example of identifying a purposed training topic in accordance with various embodiments of the present invention.

DETAILED DESCRIPTION

Figure 1:
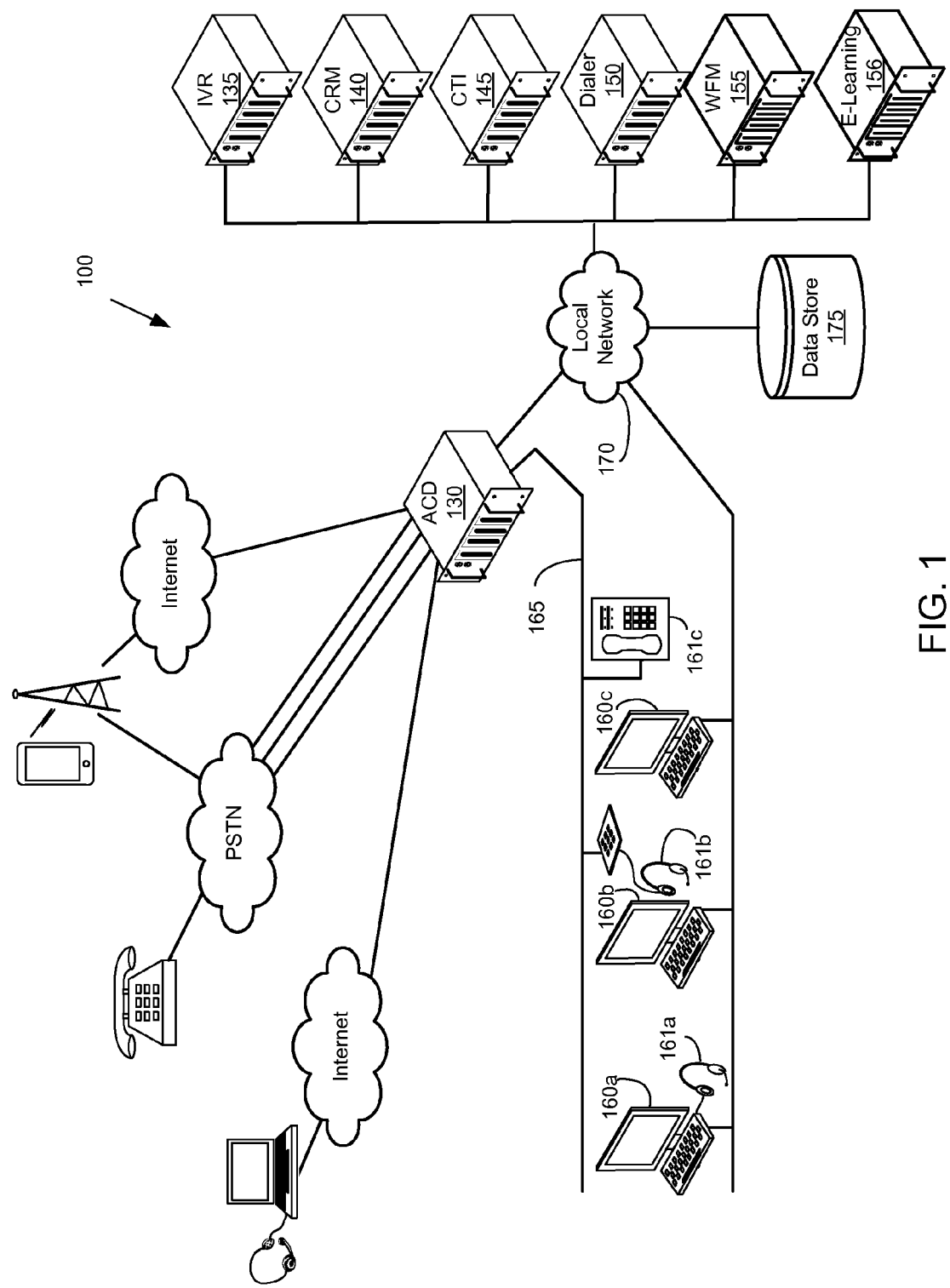
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

The contents of U.S. patent application Ser. No. 13/624,023 filed Sep. 21, 2012, entitled "Learning Management System for Call Center Agents," (referred to herein as the "LMS application"), are incorporated by reference. The LMS application discloses a learning management system ("LMS") framework for providing training content in various forms to, for example, call center agents. The LMS provides for delivery of content that may incorporate some form of testing and/or agent interaction for ascertaining the agent's knowledge. Further, the testing portion itself can serve to further instruct the agent. The content that may be delivered by the LMS encompasses various forms, including content that mixes entertainment and educational aspects. For example, the training content may be structured as a game while also imparting knowledge to the agent. The LMS can record agent scores based on the agent interacting with a test that is part of the training content.

In addition, the contents of U.S. patent application Ser. No. 13/666,546 filed Nov. 1, 2012, entitled "Incentive-Based Training Management System for Call Center Agents," (referred to herein as the "IBTMS application"), are incorporated by reference. The IBTMS application builds upon the LMS framework to further provide contests in which awards may be presented to participants. Specifically, individual or groups of agents may interact with training content in a contest form and receive awards and/or other forms of recognition based on their level of interaction with the training content. Thus, in the IBTMS application, the LMS framework described in the LMS application is extended to provide an incentive-based training ("IBT") system capable of delivering training content that is further coupled with procedures for providing agent motivation via various means, including participation in contests and providing awards based on agents' interactions with the training content.

The present application further builds upon the LMS framework in providing mechanisms to identify training topics based on communication analytics and to identify agents to schedule for training based on the identified training topics. Once scheduled, the agents may receive training as described in the LMS application and/or the IBTMS application.

Exemplary Call Center Architecture

FIG. 1 shows one embodiment of a call center architecture 100 illustrating the various technologies disclosed herein. A thorough discussion of the various elements can be found in the aforementioned LMS patent application. The call center architecture 100 shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, in various embodiments, the call center may be considered a contact center. However, for purposes of this disclosure, the term "call center" is used throughout, although it is understood that the principles may apply to a contact center.

Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 160*a*-160*c*, such as a computer, and a voice device 161*a*-161*c*. The combination of computing device 160*a*-160*c* and voice device 161*a*-161*c* may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161*a*-161*c* at the agent's position. Similarly, "routing the call to the agent" means routing a call to the appropriate equipment at an agent's position.

In particular embodiments, the voice device 161*a*-161*c* used by an agent may be a soft phone device exemplified by a headset 161*a* connected to the computer 160*a*. The soft phone device may be a virtual telephone implemented in part by an application program executing on the computer 160*a*. Further, the phone may also comprise an Internet Protocol ("IP") based headset 161*b* or a conventional phone 161*c*. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

Depending on the embodiment, interaction between the ACD 130, an IVR 135, a CTI server 145, the agent computers 160*a*-160*c*, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer 160*b* to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 150, such as a predictive dialer, to originate outbound calls on behalf of an agent at a rate designed to meet various criterion. Similar to the other components within the call center architecture 100, depending on the embodiment, the dialer 150 may comprise one or more software modules executing on a processing device hardware platform.

Another server that is employed in the call center architecture 100 shown in FIG. 1 is a workforce management ("WFM") 155. As is discussed in further detail below, in various embodiments, the WFM 155 maintains information and generates agents' schedules to effectively handle inbound/outbound communications. For instance, in particular embodiments, the WFM 155 maintains historical call volume information for call campaigns and generates forecasts for expected call volume based on the historical information to predict the number of agents needed to handle the call volume at a defined service level. The WFM 155 then applies the forecasts and information about available agents to generate work rosters of agents (e.g., schedules). That is, the WFM 155 schedules agents for work shifts according to the anticipated needs of the call campaigns.

Finally, in various embodiments, the call center architecture 100 may include an e-learning system 156 to provide various training-related functions as is described in greater detail below. Further, in particular embodiments, the e-learning system 156 may coordinate other components to provide such functionality. Depending on the embodiment, the e-learning system 156 may be a distinct system that cooperates with the WFM 155, or the e-learning system 156 may be incorporated into the WFM 155. Thus, various embodiments of the e-learning system 156 are possible besides the embodiment shown in FIG. 1. Further details on the e-learning system's 156 architecture are discussed below.

Although the above components may be referred to as a "server," each may be also referred to in the art as a "computing device," "processing device," or "system." A server may incorporate a local data store 175 and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, dialer 150, WFM 155, e-learning system 156, or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the components identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences. Finally, although the embodiments presented herein are illustrated using agents in a call center, the concepts and technologies presented herein can be applied to other form of students engaged in receiving e-learning. This includes, for example, other employees receiving technical training, learn-at-home education programs, etc.

Figure 2:
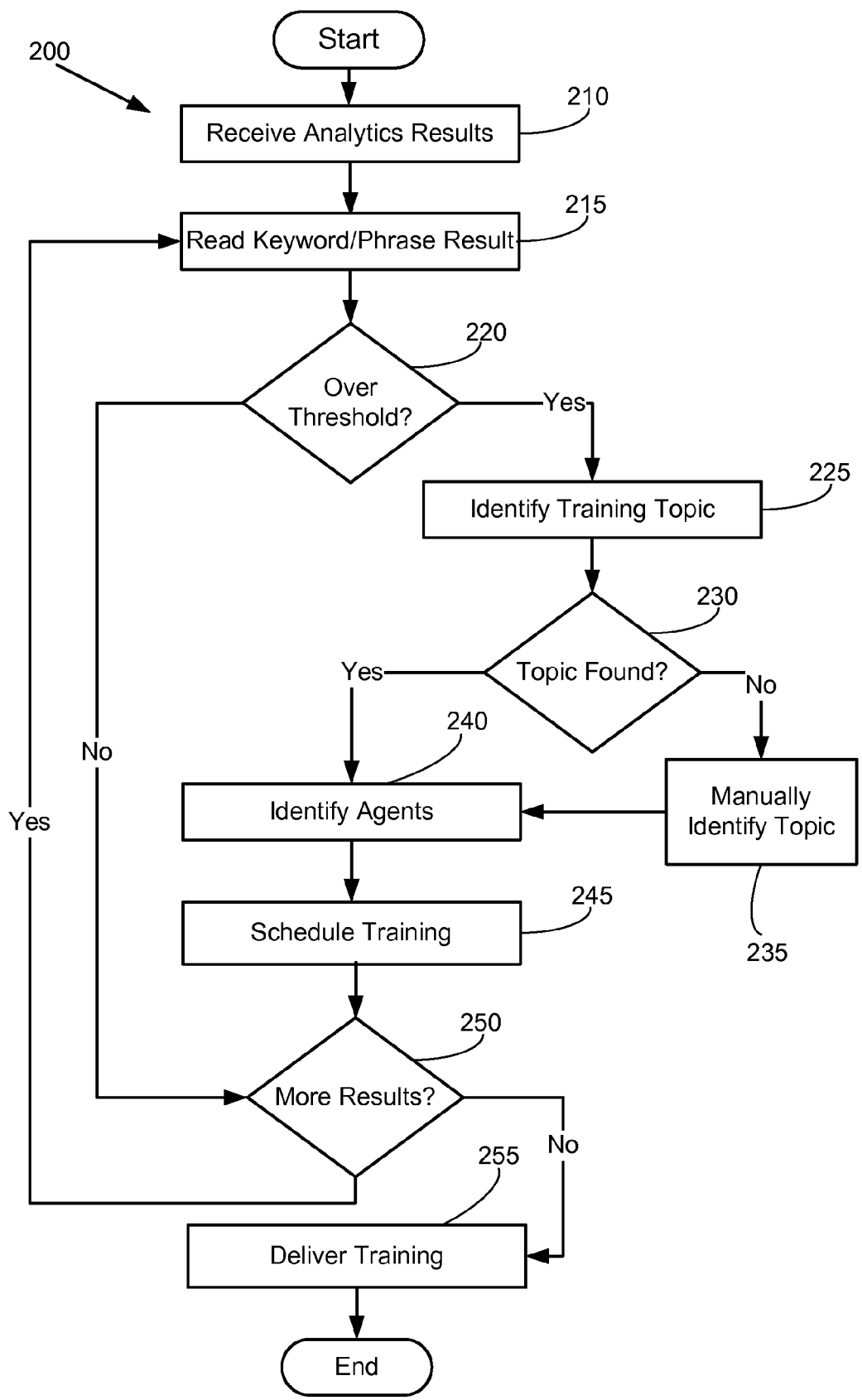
FIG. 2 is a flowchart illustrating an overview of a process for identifying training topics based on analysis of call center communications and providing agents with training on the identified training topics in accordance with various embodiments of the present invention.

General Overview of Communication Analytics and Training Topic Identification Process FIG. 2 provides an overview of a process 200 for identifying training topics based on receiving communication analytics results and providing training to agents for the identified training topics according to various embodiments. As is described in further detail in the disclosure below, the call center collects information on communications conducted between agents of the call center and contacting/contacted parties. Depending on the embodiment, these communications may include one or more of telephone calls, emails, text messages, Web chats, and so forth. However, for purposes of illustrating the concepts and technologies in this disclosure, the communications are telephone calls. Thus, the call center records various telephone calls conducted between agents and calling/called parties.

Further, in various embodiments, the call center has analytics performed on the recorded calls to extract information about the calls. For instance, in particular embodiments, the call center has speech analytics performed on the calls. In general, speech analytics comprises methods of analyzing speech to extract useful information about the content of the speech. For example, speech analytics may be applied to one or more conversations (e.g., phone calls) to identify keywords or phrases spoken during the conversations. As one of ordinary skill in the art will understand, depending on the circumstances, speech analytics may be carried out by using any number of different approaches such as, for example, the phonetic approach, the large-vocabulary continuous speech recognition (LVCSR) approach, and/or the direct phrase recognition approach.

At a high level, the process 200 shown in FIG. 2 involves: receiving analytics results, reading results on a particular keyword or phrase identified in the analytics results, determining whether the results on the keyword or phrase meet a threshold, and if so, identifying a training topic based on the keyword or phrase, identifying one or more agents to be trained on the training topic, scheduling the one or more agents to receive training on the training topic, and delivering the training to the agents. An example is now provided for purposes of describing the process 200 in more detail below. The example involves a call center fielding service calls for a U.S. car manufacturer such as Ford® or General Motors®. For this example, the car allowance rebate system, colloquially known as "cash for clunkers," was previously introduced by the U.S. federal government. Under this program, U.S. residents receive an incentive (rebate) for purchasing a new, more fuel-efficient vehicle when trading in a less fuel-efficient vehicle. Further, under the program, certain manufacturer's models qualify as a new, more fuel-efficient vehicle under the program and certain manufacturer's models qualify as a less fuel-efficient vehicle under the program. Thus, in order for a purchaser to receive the rebate, the purchaser must purchase a "qualified" manufacturer's new, more fuel-efficient model and must trade in a "qualified" manufacturer's less fuel-efficient model.

In this instance, the call center begins to receive several calls from individuals inquiring as to which of the manufacturer's models qualify for the program and these calls are recorded. After a certain period of time recording the calls (e.g., at the end of a workday), the call center has speech analytics conducted on the recorded calls. As one of ordinary skill in the art will understand, depending on the embodiment, the call center may conduct the analysis on the calls itself or may have a third-party conduct the analysis on the calls. That is, in certain instances, the call center sends the recorded calls to a contracted third-party that specializes in conducting speech analytics.

As previously mentioned, in particular instances, the speech analytics may involve identifying certain keywords and/or phrases that are spoken during the phone calls. For example, in certain instances, the call center may identify certain keywords and/or phrases for the party conducting the analysis on the phone calls to search for being spoken during the calls. In addition, in certain instances, the speech analytics may involve identifying a pattern of certain keywords and/or phrases being spoken during the phone calls. That is, in these instances, the call center may not only want the party conducting the analysis to necessarily search for certain keywords and/or phrases identified by the call center, but may also want the party to search for occurrences of keywords and/or phrases that are frequently spoken during the phone calls. For instance, returning to the example, the party conducting the analysis may identify that a number of the conversations conducted during the phone calls fielded by the call center agents included the phrase "cash for clunkers," although the call center did not ask the party conducting the analysis to specifically search for this particular phrase. Once the analysis is completed, the results of the analysis are provided to the call center.

Thus, in operation 210, the process 200 begins with the call center receiving the analytics results. At this point, the results are reviewed for any identified keywords and/or phrases and the results for a first identified keyword or phrase is read in operation 215. It should be noted that in various embodiments, a number of the operations for the process 200 shown in FIG. 2 are automated. That is, a number of the operations are carried out by a computer system automatically. For instance, in various embodiments, the e-learning system 156 described above with to respect the call center architecture 100 in FIG. 1 receives the analytics results and reads the results for the first identified keyword or phrase. Therefore, returning to the example, the e-learning system 156 reads the results for the identified phrase "cash for clunkers."

Once read, the e-learning system 156 determines whether the results for the keyword or phrase meet a pre-defined threshold in operation 220. That is, in various embodiments, the call center may define one or more rules comprising thresholds used to identify keywords and/or phrases of interest with respect to the analytics results. In various embodiments, these keywords and/or phrases of interest may involve identifying instances in which training of agents may be warranted (e.g., may be required or considered) as a result of the frequency these keywords and/or phrases occur during phone calls. For instance, the call center may determine that agents are frequently handling a particular topic during phone conversations because one or more keywords or phrases that are tied to the particular topic are being spoken frequently during these conversations. As a result, the call center may want to provide training on the particular topic so that agents are better able to handle phone calls in which the particular topic is a part of the conversation. Depending on the circumstances, this training may involve a "refresher" on a topic that agents had previously been trained on or this training may involve a "new" topic that agents have not necessarily been previously trained on, however the topic has become important for agents to be able to handle in light of the frequency it occurs during conversations.

Thus, returning to the example, the call center may define a rule (e.g., threshold) for the e-learning system 156 to identify when a keyword or phrase has been spoken during twenty-five phone calls by at least five different agents during a workday. Thus, in this instance, the analytics results for the phrase "cash for clunkers" may show that the phrase was spoken during thirty-three phone calls that were handled by ten different agents for a particular workday. Accordingly, the e-learning system 156 system determines the results for the phrase "cash for clunkers" meets the threshold and therefore is of interest.

At this point, the e-learning system 156 attempts to identify a training topic based on the identified keyword or phrase of interest in operation 225. "Training topic" as used herein may refer to a set of training materials associated with a common subject matter or a specific training course associated with the particular subject matter. In one embodiment, the call center may store records in one or more databases (e.g., training topic profile databases) that link keywords and phrases to training topics. Thus, in this embodiment, the e-learning system 156 queries the databases and determines whether a training topic has been associated with the identified keyword or phrase of interest in operation 230. At this point, if the e-learning system 156 determines a training topic has been associated with the keyword or phrase of interest, then in various embodiments the e-learning system 156 continues on with an automated process for identifying agents for training based on the identified training topic and for scheduling such agents for training. Further details on this automated process are provided below. In some embodiments, the e-learning system 156 may offer one or more suggested training topics and the call center administrator may confirm one or more of the recommended topics. In other embodiments as described below, call center administrators may provide input as to the appropriate training topic(s).

However, returning to the example, since the "cash for clunkers" program has been recently implemented by the federal government, the call center has not had an opportunity to identify any related training topics for this phrase. Thus, as a result, the e-learning system 156 is unable to identify a training topic associated with the phrase "cash for clunkers." Accordingly, in various embodiments, the e-learning system 156 saves the results for the identified phrase of interest so that a manual process may be followed to identify an appropriate training topic and the appropriate agents to schedule training on the topic.

As is discussed in greater detail below, in various embodiments, the call center provides one or more training topic management tools that allow a call center employee, such as an administrator, to review the saved information for identified keywords and phrases of interest that could not be associated with a training topic. After reviewing the information for a particular keyword or phrase of interest, these training topic management tools allow the administrator to select one or more training topics to be associated with the keyword or phrase of interest. Further, in various embodiments, other components within the e-learning system 156 then allow the administrator to identify and schedule agents for training based on the manually selected training topics. Furthermore, in particular embodiments, the training topic management tools also include capabilities to provide recommendations to the administrator on training topics to associate with the particular keyword or phrase of interest.

Thus, returning to the example, one or more training topics are manually selected for the phrase "cash for clunkers" by utilizing the training topic management tools in operation 235. In this instance, the administrator reviews the information for the phrase "cash for clunkers" and determines that based on the number of occurrences in which agents have received inquiries for this program, it may be in the call center's best interest to educate the agents handling such inquiries on what information is available to assist them in answering these inquiries. At this point, the administrator reviews the available training topics to identify any topics that may be helpful to the agents with respect to these inquires. For instance, in particular embodiments, the administrator may inquire from internal and/or external sources as to what training it available. For example, the call center may be contracted with one or more third-party training content providers and the administrator may inquire from these providers whether they have any training content on the "cash for clunkers" program.

In this instance, since the program is new, the administrator does not find a training topic specifically on the "cash for clunkers" program per se. However, the administrator does find a training topic on guidelines for locating information on government supported programs within the call center's computer systems. The administrator reviews the training topic and determines that learning how to find such information may be beneficial to agents because such information may enable agents to locate a listing of the automaker's vehicles that qualify for this program. As a result, the administrator associates this training topic with the phrase "cash for clunkers." That is, in one embodiment, the administrator saves a record that links the training topic to the phrase "cash for clunkers" in one or more of the training topic profile databases. As a result, it is noted that in particular embodiments the e-learning system 156 may now utilize the automated process for identifying the appropriate training topic and identifying and scheduling the appropriate agents for training the next time this phrase is identified as being of interest.

At this point, the administrator may identify appropriate agents to receive training on the topic in operation 240. Depending on the embodiment, the administrator may identify the appropriate agents based on a number of different factors such as, for example, whether an agent receives calls that apply to the training topic (e.g., whether the agent receives calls with regard to the "cash for clunkers" program), whether the agent qualifies to receive training for the training topic, whether the agent recently received training on the particular topic, etc. Those of ordinary skill in the art can envision many different criteria that may be used to identify the agents to receive training on the topic in light of this disclosure.

Once the appropriate agents to receive the training have been identified, the agents are scheduled to receive the training in operation 245. Depending on the embodiment, this operation may involve invoking one or more components of the call center, such as the WFM 155 for example, to schedule the training for the identified agents and/or may involve identifying criteria for delivering the training to the agents. Furthermore, the administrator may identify the type of training to be received by the agents as detailed in the LMS and/or IBTMS applications.

Finally, as previously mentioned, under the automated process, the e-learning system 156 in various embodiments typically carries out the operations of identifying the appropriate agents and scheduling the identified agents to receive the training automatically in instances in which one or more training topics are automatically identified for the particular keyword or phrase. For instance, in particular embodiments, once the e-learning system 156 has identified a training topic for a keyword or phrase of interest, the training management system 156 may apply various rules and procedures for identifying the appropriate agents to receive training on the topic and for scheduling the agents for such training.

Returning to FIG. 2, at this point the e-learning system 156 may determine whether more keyword and/or phrase results exist that need to be considered in operation 250. If so, the e-learning system 156 returns to operation 215 and reads the results for the next keyword or phrase and repeats the operations described above with respect to the results for the next keyword or phrase. If no more results exist, the e-learning system 156 instead carries out the necessary steps to deliver the training for the identified topic(s) to the identified agents in operation 255. The types of training on the topic(s) and methods and mechanisms for delivering such training are detailed in the above-mentioned LMS and IBTMS applications.

Learning Management System Architecture

Figure 3:
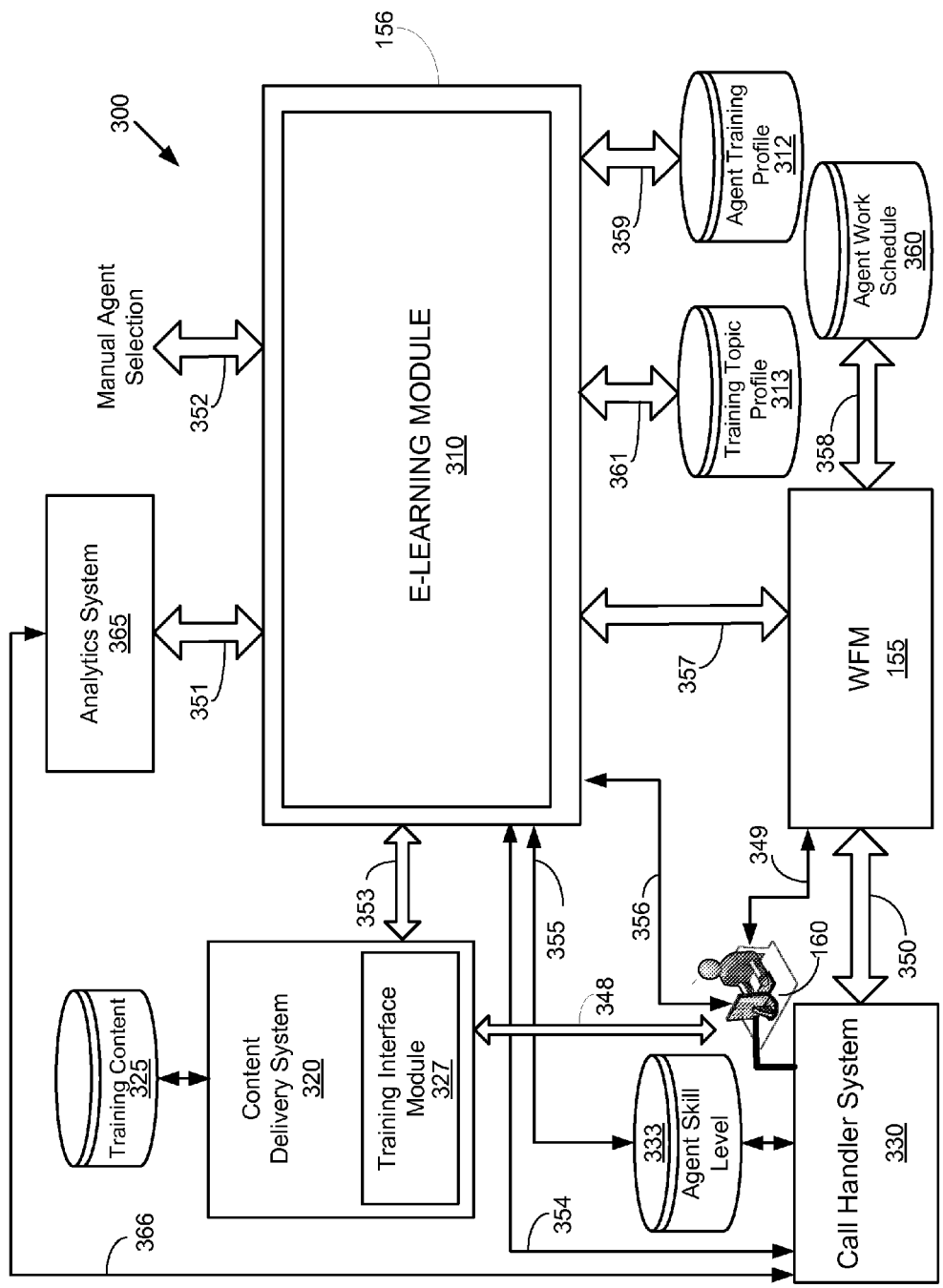
FIG. 3 illustrates a learning management system architecture comprising an e-learning module in accordance with various embodiments of the present invention.

One embodiment of a learning management system architecture 300 is described in FIG. 3. This architecture 300 is only one possible embodiment, as one skilled in the art will recognize that various functions illustrated can be implemented in different ways without departing from the concepts and technologies disclosed herein. The learning management system architecture 300 generally builds upon the LMS architecture described in the LMS application and those skilled in the art will note similarity of various components. The primary focus herein is on the additional modules, components, and capabilities for managing the identification of training topics based on communication analytics and identifying and scheduling agents for training based on the identified topics. The structure and operation for delivery of training content is largely as described in the above-mentioned LMS and IBTMS applications. The various descriptions of the components herein focus on providing the training topic identification aspects.

Turning to FIG. 3, the learning management system architecture 300 can broadly refer to the components shown that interact and are used to accomplish identifying training topics based on communication analytics as described herein. According to the embodiment shown in FIG. 3, the learning management system architecture 300 is based in part on an e-learning module 310 for providing training to agents and coordinating among other call center components that may be involved. In particular embodiments, the e-learning module 310 is executed in the e-learning system 156 described in FIG. 1. However, in other embodiments, the e-learning module 310 may be executed in other components of the call center, such as the WFM 155 for example.

In addition, the call handler system 330 ("CHS") shown in FIG. 3 refers to the various call processing components described in FIG. 1 that may be present in a call center such as, for example, the ACD 130, dialer 150, and CTI server 145, as well as other components. Because not all call centers may have each of these call handling components, the CHS 330 broadly refers to the components in FIG. 3 that may be involved in handling calls. The CHS 330 may maintain one or more databases 333 storing agent skill level information, which can be used with skills-based routing of calls to an agent at a workstation 160. In various embodiments, when the agent is interacting with an interface, the CHS 330 is aware of the agent's interaction and corresponding status and may suspend offering calls to the agent during delivery of training content.

In various embodiments, the CHS 330 may have an interface 350 to a WFM 155 configured to schedule agents to work call campaigns and for training sessions in the call center. In addition, in particular embodiments, the WFM 155 may have an interface 358 and may maintain one or more databases 360 of agent work schedule information that may include work schedules and scheduled training sessions for each of the agents. Further, in particular embodiments, the WFM 155 may provide notifications of an agent's work schedule and/or training sessions to an agent via the agent's workstation 160 over an interface 349 and/or over a mobile device (not shown) used by the agent. For instance, the notifications may inform the agent of an upcoming, beginning, or ending of a lunch break, work break, or other activity such as a training session. In addition, in particular embodiments, the WFM 155 may also inform the CHS 330 over the interface 350 when an agent's training session actually starts and ends. In these particular embodiments, the WFM 155 may also identify the agent to the CHS 330. Thus, in particular instances, such identification allows the CHS 330 to suspend and resume call routing to the agent's workstation 160 as appropriate and avoids the agent from having to manually suspend and resume call processing. Consequently, when the agent is in a training session, the CHS 330 is aware of the agent's status and suspends offering calls to the agent. In particular embodiments, the WFM 155 may also provide copies of the notifications of scheduled agent training session activities over an interface 357 to the e-learning module 310. For instance, the WFM 155 may notify the e-learning module 310 when a specific agent is to begin or end a training session.

It is noted that various embodiments of the learning management system architecture 300 may not necessarily include each of the components shown in FIG. 3. For instance, in some embodiments, only a subset of the components may be present. For example, in particular embodiments, the CHS 330 may not be integrated with the learning management system architecture 300. Thus, in these particular embodiments, the learning management system architecture 300 may comprise the e-learning module 310 in the e-learning system 156, the WFM 155, and/or the CDS 320. That is, the e-learning module 310 coordinates with the WFM 155 and CDS 320 to provide training content to agents, but in one embodiment there is no integration with the CHS 330. As a result, in these particular embodiments, agents may be scheduled for training and may receive content via their workstations 160. However, the CHS 310 is not apprised or updated with regard to the agents' training as it may be otherwise. This may require the agents to manually log-in and log-off from the CHS 310 in response to receiving notifications from the WFM 155. In other embodiments, there is integration with the CHS 330 so that agents are not required to manually log-in and log-off for training sessions.

It is further noted that, in various embodiments, the learning management system architecture 300 can be deployed in full, or in part, as a hosted service in a "cloud" computing environment. Thus, in particular instances, the hosted learning management system architecture 300 may interact and coordinate with various premise-based components such as a WFM 155, CHS 330, and/or CDS 320. As those of ordinary skill in the art can envision, various other combinations of components may exist in other embodiments.

In various embodiments, the e-learning module 310 does not directly deliver the actual training content to the agent but requests a content delivery system ("CDS") 320 to provide the content to the agent. For instance, in particular embodiments, the e-learning module 310 instructs the CDS 320 to deliver the training content to an agent and delivery is accomplished via an interface 348 between the CDS 320 and the agent's workstation 160. In addition, in particular embodiments, a training interface module 327 can return to the e-learning module 310 in real-time, information on an agent interacting with training content. Further, in particular embodiments, the CDS 320 may access one or more databases 325 of training content for presentation to the agent.

In various embodiments, the CDS 320 and/or the one or more training content databases 325 may be operated by a third-party. That is, the CDS 320 may be operated by an entity that does not operate or control the e-learning module 310, WFM 155, and/or CHS 330. Thus, an interface 353 may be configured to accommodate identification of a third-party CDS provider, incorporate appropriate security mechanisms, and accommodate invoicing and payment procedures. Further details about accommodating third-party CDS providers are discussed in the LMS and IBTMS applications.

Further, in particular embodiments, the e-learning module 310 may also have one or more interfaces with the CHS 330, one or more agent skill level databases 333, and/or agent workstations 160. An interface 354 with the CHS 330 may be configured to receive indications of an agent's status, as well as call volume indicators and other data. For instance, the CHS 330 may provide data to the e-learning module 310 indicating how busy the call center is, as well as how busy a particular agent is. If the particular agent is not busy, the e-learning module 310 may trigger the delivery of training content to the agent using a flex-time format. If the call volume later increases, then the e-learning module 310 may cease providing the training content to the agent.

In addition, an interface 355 between the e-learning module 310 and the one or more agent skill level databases 333 may allow the e-learning module 310 to update an agent's skill level once an agent has completed the appropriate training. In turn, in particular embodiments, updating the agent skill level may allow the CHS 330 to update skills-based routing for the agent as a result of the agent acquiring new skills via the training Further, an interface 356 between the e-learning module 310 and an agent workstation 160 may allow the e-learning module 310 to provide notifications to the agent regarding a training session and to perform other administrative functions involving the agent. For instance, in particular embodiments, these notifications may be provided on the agent's workstation 160 and/or to a smart phone used by the agent. In addition, these notifications may also inform the agent of the agent's progress with respect to a training topic, inform the agent successfully completing a training topic, and/or recognize a higher agent skill level.

In particular embodiments, this interface 356 may also be used by an agent to request training content from the e-learning module 310, e.g., in an on-demand manner. Furthermore, in some embodiments, the interface 356 may be used by the agent to access training content from a different computer besides the computer associated with the agent's workstation 160. For example, a call center agent may also request training content when at home during off-hours. In this case, the interface 356 may incorporate additional security mechanisms to allow an agent to request and receive training at another computer.

Returning to FIG. 3, the e-learning module 310 may also incorporate an interface 351 to receive communication analytics results and the like. For instance, in particular embodiments, the CHS 330 records communications (e.g., phone calls, text messages, emails, Web chats, etc.) conducted between agents and various parties and routinely sends the recorded communications to an analytics system 365 over an interface 366. In other embodiments, the analytics system 365, itself, may record the communications by bridging onto conversations in the CHS 330. As previously mentioned, the analytics system 365 may be included in the call center architecture 100 or may be a third-party provider who performs the analytics on the communications. Accordingly, once the analytics system 365 has completed analysis on the communications, the analytics system 365 sends results on the analysis over the interface 351 to the e-learning module 310. As previously mentioned, the results received over this interface 351 are used to identify training topics to be presented to agents.

In addition, in various embodiments, the e-learning module 310 may incorporate a manual agent selection interface 352. For instance, in particular embodiments, this interface 352 may be used by an administrator for manually selecting agents for receiving training for the identified topics. For instance, in particular embodiments, the interface 352 may be a GUI comprising agent selection tools used to identify agents to receive training Further, in various embodiments, the e-learning module 310 may also incorporate an interface 359 to one or more agent training profile databases 312. In these particular embodiments, the agent training profile databases 312 store agent training-related information. For example, the databases 312 may store one or more of indications that the content associated with particular training topics have been completed by agents, the results of training interactions by agents, and/or certifications of skill levels for agents. Likewise, in various embodiments, the e-learning module 310 may also incorporate an interface 361 to one or more training topic profile databases 313. In these particular embodiments, the training topic profile databases 313 store training topic-related data/information. For example, the training topic profile databases 313 may store information on training topics and related keywords and phrases for the training topics. As described in greater detail below, these related keywords and phrases are what may be searched for in communications during the analysis performed on the communications to help identify instances in which training on a particular topic may be appropriate.

It should be noted that the diagrammatic representation of the learning management system architecture 300 shown in FIG. 3 may be implemented using a variety of physical components and arrangements according to various embodiments. Thus, the logical representation of the components shown in FIG. 3 may be implemented on a single processing system, a distributed processing system, or other configurations as one of ordinary skill in the art can envision in light of this disclosure.

E-Learning Module

Figure 4:
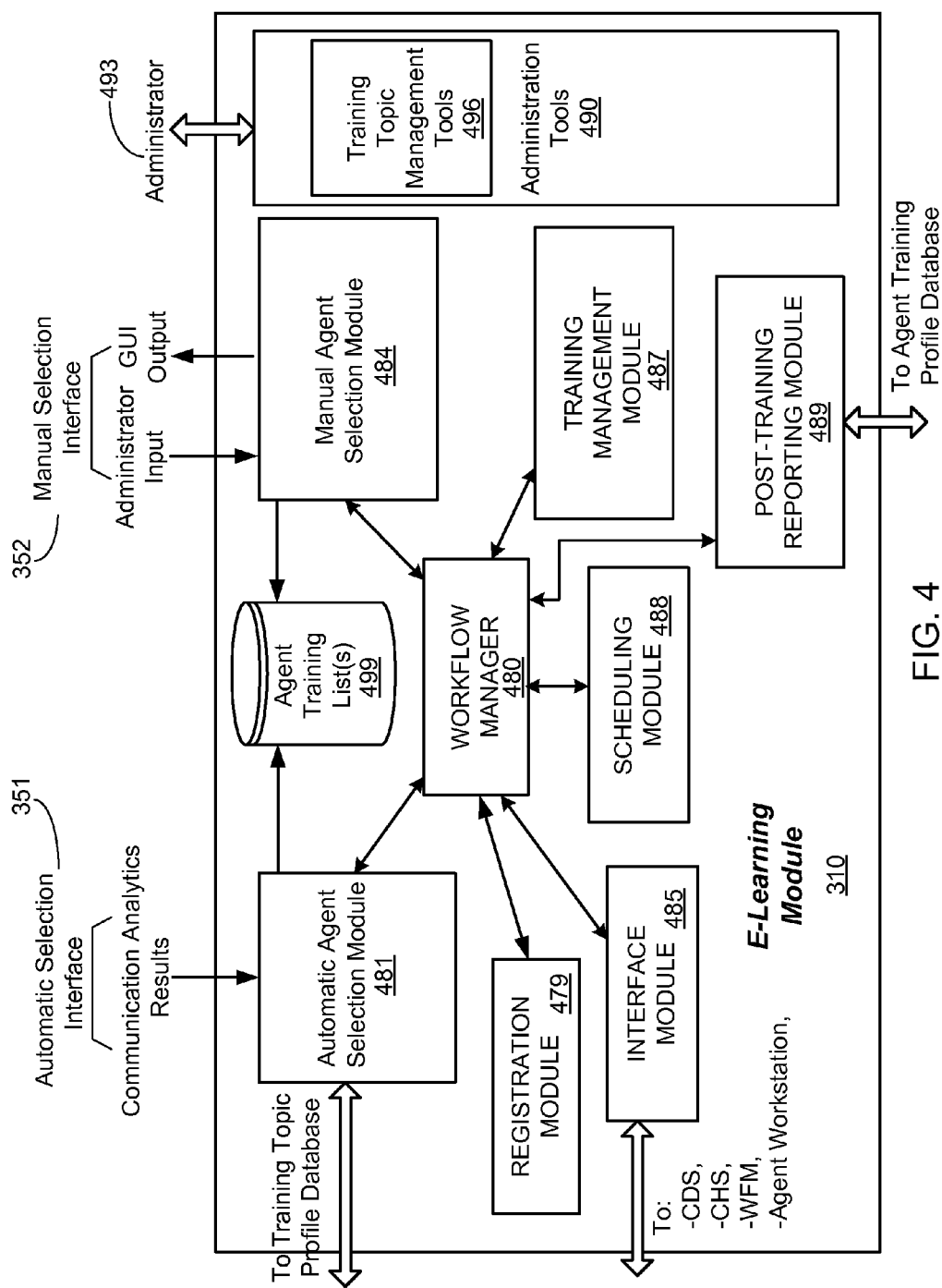
FIG. 4 illustrates an e-learning module in accordance with various embodiments of the present invention.

An architecture of the e-learning module 310 is illustrated in FIG. 4 according to various embodiments of the invention. Depending on the embodiment, the e-learning module 310 may be implemented in various ways and comprise various modules. Such as, for example, in one embodiment the module 310 is incorporated into the WFM 155. While in other embodiments, the module 310 may be implemented using a separate computing platform (such as the e-learning system 156) interacting with the WFM 155 and/or other components of the call center. However, for purposes of illustration, the e-learning module 310 is shown in FIG. 4 as being separate from the WFM 155.

In the particular embodiment shown in FIG. 4, the e-learning module 310 may comprise a number of modules performing various functions and operations. Some of these modules may have the same functionality as found in the LMS and/or IBTMS as described in the LMS and/or IBTMS applications, and some modules may have additional functionality. However, as one of ordinary skill in the art will appreciate, various implementations of the e-learning module 310 may make use of a greater or a fewer number of modules and/or allocate various functions and operations differently between the modules where feasible.

As previously described, two primary parts of the process are identifying one or more training topics based on a particular set of analytics results and selecting agents who are to receive training based on the identified topics. In various embodiments, these two primary parts of the process may be associated with one or more modules, i.e., the automated agent selection module 481, the manual agent selection module 484, and/or the training topic management tools 496.

For instance, in particular embodiments, the automatic agent selection module 481 receives analytics results via an automatic selection interface 351 and applies one or more rules comprising thresholds to the results to identify one or more keywords and/or phrases of interest. Once identified, the automatic agent selection module 481 may further identify training topics associated with the keywords and phrases of interest and apply one or more additional rules to identify agents for training on the identified training topics. In addition, in some embodiments, the automatic agent selection module 481 may solicit administrator input to confirm the selections of the training topics and/or agents.

In other embodiments, the selection aspects of which training topics and/or agents to train is performed by the manual agent selection module 484 and/or the training topic management tools 496 interacting with a user, e.g., a call center administrator. In these particular embodiments, a greater reliance on user input is required for selection of training topics and/or agents. For instance, in particular embodiments, the training topic management tools 496 may incorporate various training topic selection tools to aid a user, e.g., a call center administrator, in manually identifying training topics based on analytics results. Likewise, in particular embodiments, the manual agent selection module 484 may provide various agent selection tools to aid a user in selecting agents thru a manual selection interface 352. Depending on the embodiment, these modules 481, 484, 496 may interact with one or more agent training list databases 499 configured to store the list of agents identified to receive training and related training context data and/or one or more training topic profile databases 313 configured to store various training topics and related keywords and phrases for the training topics. In particular embodiments, the automatic agent selection module 481 and the manual agent selection module 484 may retrieve a master list of agents from the WFM 155 using the aforementioned interface 357.

As for the remaining components of the e-learning module 310, these components operation in a manner as previously described in the LMS application. For instance, in particular embodiments, the registration module 479 registers the agents and ensures that all conditions are met in order for the agent to receive training Depending on how the training is to be delivered, the scheduling module 488 may access the list of agents in the one or more agent training list databases 499 to schedule the agents to receive fixed-time training sessions. In addition, the interface module 485 provides the necessary interface to the CDS 320 and other components which the e-learning module 310 needs to communicate with during the course of delivering training to agents. In various embodiments, the post-training reporting module 489 reports the training results and/or updates the one or more agent training profile databases 312. In particular instances, the post-training reporting module 489 reports course completion data. The workflow manager 480 controls which modules are invoked and controls the overall process flow.

In various embodiments, the administration tools 490 allows users (e.g., a call center administrator 493) to access a training management module 487 for setting and configuring the e-learning module 310, such as, for instance, loading available training content for various training topics, linking training topics to keywords and phrases, and/or defining rules associated with providing training to agents. Further, in particular embodiments, the administration tools 490 provide an interface to users, e.g., the call center administrator 493, to define or modify various controls and parameters associated with system configuration. For instance, in particular embodiments, the administration tools 490 include the training topic management tools 496 to aid a call center administrator 493 in defining, modifying, and managing training topics and associated information such as keywords and/or phrases used to identify these training topics. Further information on these modules is detailed in the aforementioned patent applications.

The above description is a high level overview of one embodiment of the e-learning module 310 and corresponding modules for providing training content to agents. The architecture of the e-learning module 310 shown in FIG. 4 is only one such configuration of the e-learning module 310 and other configurations may be implemented in other embodiments.

Automatic Agent Selection Module

Figure 5:
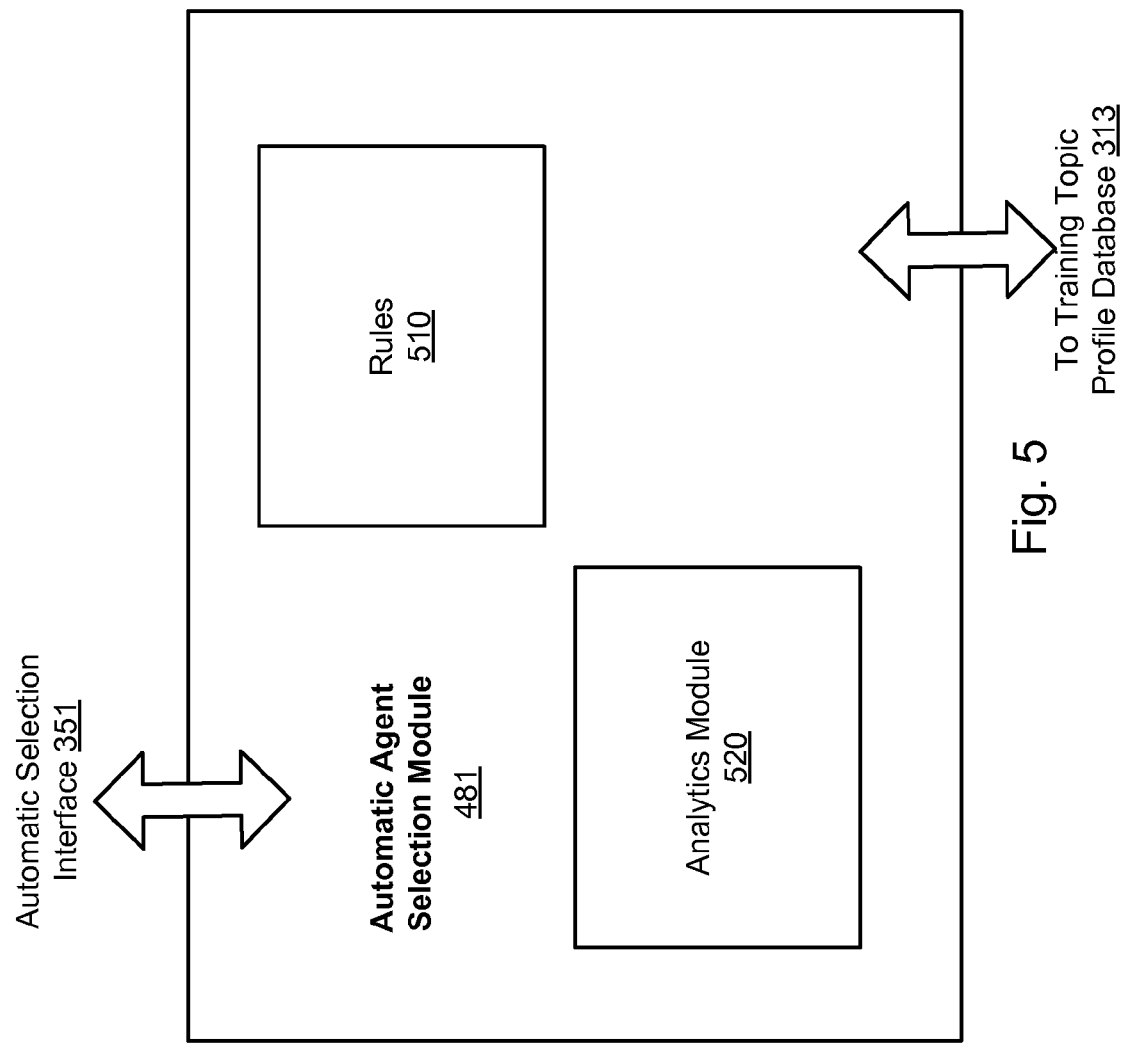
FIG. 5 illustrates an automatic agent selection module in accordance with various embodiments of the present invention.

An architecture of the automatic agent selection module 481 is illustrated in FIG. 5 according to various embodiments of the invention. The architecture shown in FIG. 5 includes the automatic selection interface 351 previously described. In particular embodiments, this interface 351 is used to communicate with an analytics system 365 so that the module 481 may receive analytics results for an analysis performed on agent communications. For example, in one embodiment, the analytics system 365 may receive or store a number of recorded telephone conversations conducted between agents at a call center and calling/called parties over a particular workday and performs speech analytics on the recorded conversations.

Once completed, the analytics system 365 forwards the analytics results to the automatic agent selection module 481 over the automatic selection interface 351. In turn, the automatic agent selection module 481 processes the results to identify training topics and to identify agents to received training on the identified training topics. To process the analytics results, in various embodiments, the automatic agent selection module 481 invokes an analytics module 520. As explained in greater detail below, in these particular embodiments, the analytics module 520 processes the results for a particular keyword or phrase to identify one or more training topics of interest. In processing the results, the analytics module 520 may access one or more training topic profile databases 313 and may apply various rules 510 to identify training topics of interest. In addition, the automatic agent selection module 481 may further apply various rules 510 to identify agents to schedule for training on identified training topics of interest.

Figure 6:
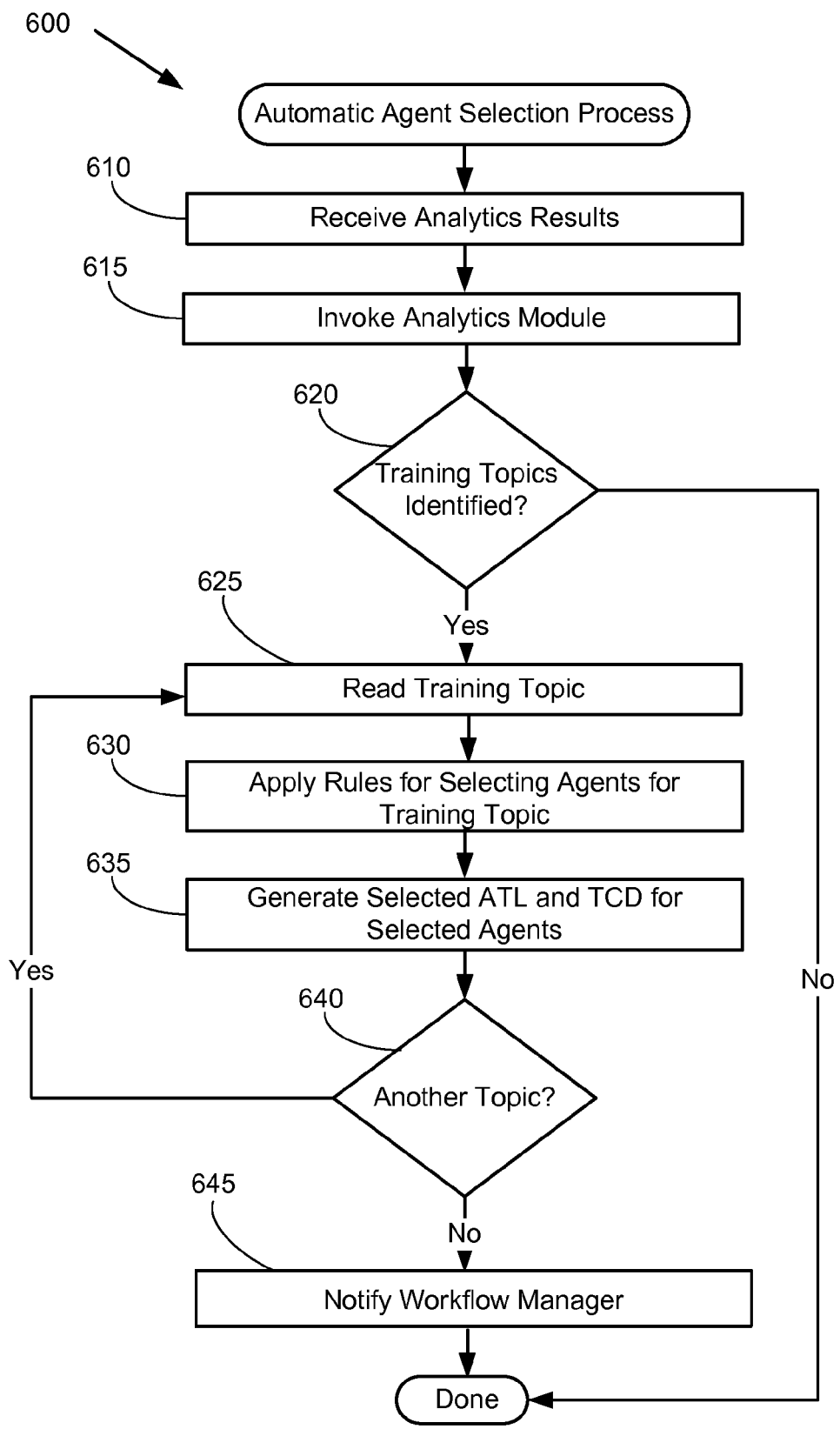
FIG. 6 is a flowchart illustrating an agent selection process in accordance with various embodiments of the present invention.

FIG. 6 describes one embodiment of a process flow 600 associated with the automatic agent selection module 481. In operation 610, the automatic agent selection module 481 receives analytics results for one or more agent communications. As previously mentioned, depending on the embodiment, the automatic agent selection module 481 may receive these results from a number of different entities such as the call center's CHS 330 or an analytics system 365. For example, the automatic agent selection module 481 may receive analytics results on a number of telephone conversations held between agents at the call center and calling/called parties.

Depending on the embodiment, the analytics results may comprise different information but in most instances, the results comprise information on keywords and/or phrases identified in the agent communications. For instance, returning to the example involving the telephone conversations, the analytics results may comprise keywords and/or phrases spoken by the agents and/or calling/called parties during the conversations. In another example involving email communications between agents and various parties, the analytics results may comprise keywords and/or phrases typed in emails exchanged between the agents and the various parties. Further, in particular instances, the results may include additional information on the keywords and/or phrases such as, for example, the number of communications the keywords and/or phrases appear in and/or the number of different agents involved in the communications the keywords and/or phrases appeared in.

Once the automatic agent selection module 481 has received the analytics results, in various embodiments, the automatic agent selection module 481 invokes the analytics module 520 in operation 615. As is provided in greater detail below, the analytics module 520 further processes the analytics results to identify one or more training topics of interest. That is, in these particular embodiments, the analytics module 520 evaluates the analytics results to identify one or more training topics that are to be presented to agents for training. As discussed further below, the evaluation process in various embodiments involves the analytics module 520 evaluating the specific results obtained on keywords and/or phrases to determine whether a particular keyword or phrase has occurred at a level that indicates agents should be trained on one or more related training topics for the particular keyword or phrase. Once the analytics module 520 has completed identifying the training topics of interest, the analytics module 520 returns the list of training topics to the automatic agent selection module 481.

Thus, the process 600 continues in operation 620 with the automatic agent selection module 481 determining whether any training topics have been identified based on the analytics results. If so, the automatic agent selection module 481 reads the first identified training topic in operation 625. At this point, in particular embodiments, the automatic agent selection module 481 applies various rules to identify agents that are to be selected for receiving training on the topic in operation 630. For instance, in particular embodiments, these rules may entail determining whether the agent is eligible to receive training on the topic. For example, a rule may be implemented that indicates that if an agent has received training on the same topic within the last two months or is to receive training (e.g., currently scheduled to receive training) on the same topic, the agent should not be scheduled for training on the topic. Those of ordinary skill in the art can envision numerous rules that may be implemented for selecting agents in light of this disclosure.

In operation 635, the automatic agent selection module 481 generates an agent training list (ATL) and training context data (TCD). The ATL basically comprises a list of the agents selected to receive training for the training topic. Further, the TCD typically comprises information on the training topic (e.g., a particular training course) and how the training for the topic is to be delivered to the selected agents. For instance, if the training is to be delivered as snippet training as described in the LMS application, the TCD may include information indicating to deliver the training as such. Further, if the training content is to be provided as incentive-based training (e.g., as a contest) as described in the IBTMS application, the associated contest may be indicated in the TCD.

At this point, the automatic agent selection module 481 determines whether another training topic has been identified by the analytics module 520 in operation 640. If so, the automatic agent selection module 481 returns to operation 625 to read the next training topic and repeats the operations described above for the next topic.

Finally, once all of the identified training topics have been addressed, the automatic agent selection module 481 informs the workflow manager 480 in operation 645 so that the process of delivering training for the identified training topics can be initiated. At this point, training on the identified topics is delivered to the identified agents as described in the aforementioned LMS and IBTMS applications. Depending on the embodiment, this training may be delivered in any one of a number of different ways as detailed in the LMS and IBTMS applications.

Analytics Module

Figure 7:
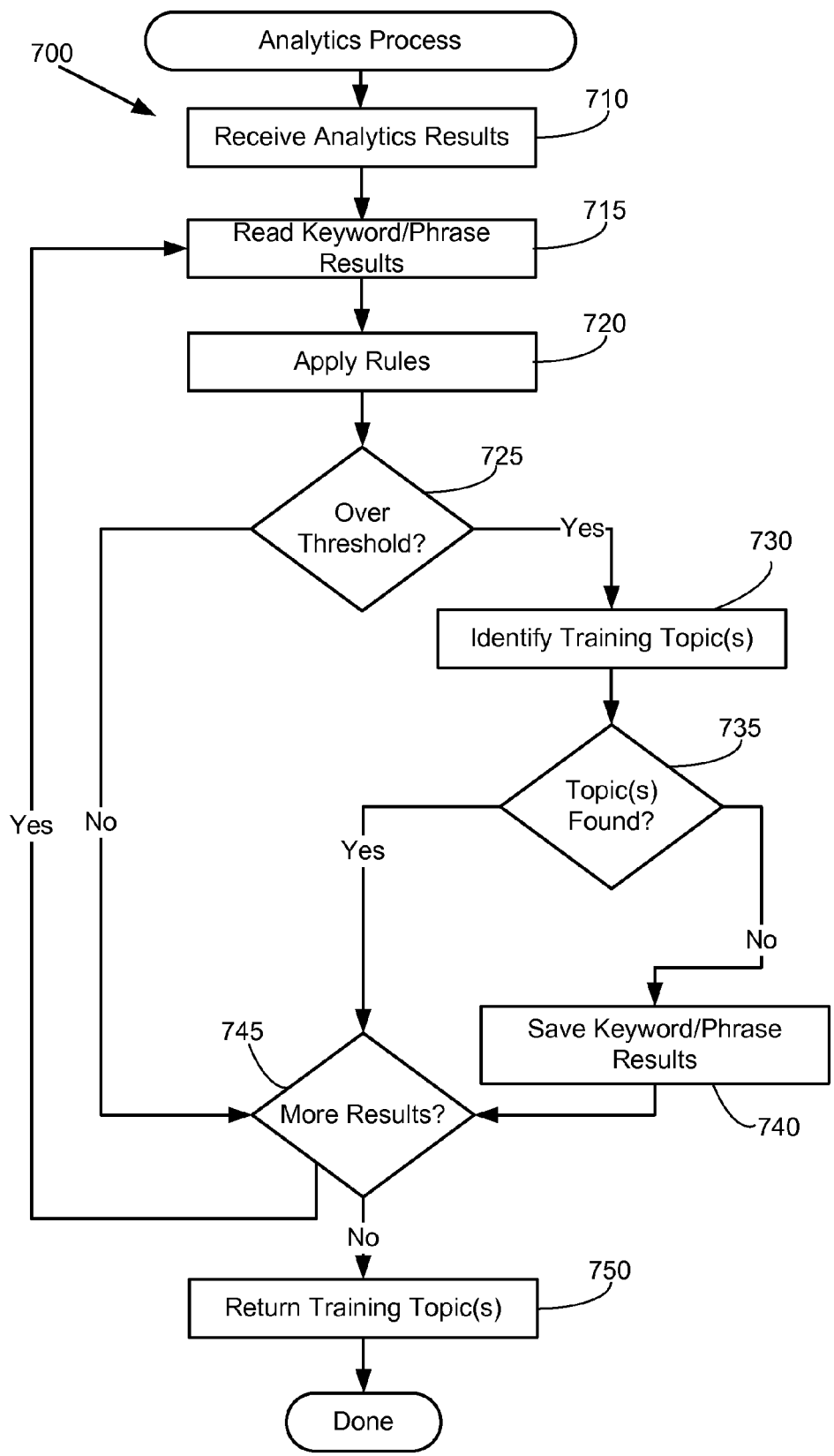
FIG. 7 is a flowchart illustrating an analytics process in accordance with various embodiments of the present invention.

FIG. 7 describes one embodiment of a process flow 700 associated with the analytics module 520. As mentioned, the analytics module 520 in various embodiments evaluates the analytics results and identifies keywords and/or phrases of interest along with associated training topics based on its evaluation of the results. That is, in various embodiments, the analytics module 520 evaluates the analytics results and determines whether any training topics associated with keywords and/or phrases of interest are available that should be presented to call center agents in light of the evaluation conducted on the analytics results.

Thus, returning to the example involving the e-learning module 310 receiving analytic results for a number of telephone conversations conducted between call center agents and calling/called parties. In this example, the call center is handling calls for a tax accounting firm and the analytics results include the identified keyphrase "first-time homebuyer tax credit." Further, the results for the keyphrase "first-time homebuyer tax credit" indicate that thirty-seven calls were handled on a particular day involving ten different agents in which the phrase was spoken during the calls.

Therefore, the process 700 begins in FIG. 7 with the analytics module 520 receiving the analytics results in operation 710. As previously mentioned, in various embodiments, the analytics module 520 is invoked by the automatic agent selection module 481 and the module 481 delivers the results to the analytics module 520. Next, the analytics module 520 reads the results for the first keyword or phrase from the analytics results in operation 715. Thus, returning to the example, the analytics module 520 reads the results for the keyphrase "first-time homebuyer tax credit."

At this point, the analytics module 520 applies one or more rules to the results to determine whether the keyword or phrase is of interest in operation 720. That is, for instance, the analytics module 520 applies one or more rules to determine whether the keyword or phrase has occurred at such a frequency that it may be beneficial for the call center agents to receive training on associated training topics so that the agents may be better able to handle communications involving the keyword or phrase.

Thus, in various embodiments, these one or more rules include one or more thresholds for determining whether the keyword or phrase has occurred as a particular frequency to be considered of interest. For instance, in the example, the call center may implement rules that indicate that if a keyword or phrase is spoken in at least twenty different telephone conversations involving at least five different agents over the course of a workday, then the keyword or phrase should be identified as being of interest. Thus, in this case, the analytics module 520 determines the results for the keyphrase "first-time homebuyer tax credit" exceed the threshold in operation 725 and therefore the keyphrase is of interest.

It is noted that in particular embodiments, other rules may be used to determine a threshold for when a keyword or keyphrase is of interest. For example, as indicated above, the threshold could be an absolute number of times the phrase is detected or based on a percentage. In other embodiments, a relative percentage number could define a threshold (e.g., when 50% of the agents use the term). Statistical analysis based on a moving time window could determine that a certain phrase, albeit occasionally used in the past, is now frequently used. The analysis could indicate that usage represents a deviation from normal historical observations. In other embodiments, the usage of detected phrases could also be coupled with other types of data to define a threshold of when the keyword is of interest. For example, if a large number of keywords are detected on service calls to agents, and those calls have a longer than average call holding duration, this suggests that those agents are encountering unfamiliar issues.

Further, agent experience levels can also be a factor in determining whether unfamiliar issues are arising and whether training is require for specific agents or agents in general. For example, novice agents may have a long average call duration when handling calls involving "first-time homebuyer tax credit," but experienced agents handling calls involving this keyword may be able to readily address the issue. This suggests that only the novice agents require training on this topic. Those skilled in the art will be able to develop a number of methods for determining when a detected keyword or keyphrase represents a need for training for a specific agent or group of agents, as opposed to agents in general.

Since the keyphrase is determined to be of interest, next the process 700 continues with the analytics module 520 identifying one or more training topics for the keyphrase of interest in operation 730. That is, for the example, the analytics module 520 identifies one or more training topics related to the keyphrase "first-time homebuyer tax credit." As mentioned, in particular embodiments, the call center may include one or more training topic profile databases 313. These databases 313 may include information on various training topics. For instance, in one embodiment, these databases 313 include profiles on various training topics in which a profile for a particular training topic includes information on keywords and/or phrases that are related to the particular training topic. Thus, in this instance, the analytics module 520 searches the profiles to attempt to identify training topics having the keyphrase "first-time homeowner tax credit" related to the topics in their corresponding profiles.

In operation 735, the analytics module 520 determines whether any topics were found. If none were found, then in operation 740 the analytics module 520 saves the results along with their association of the keyword or phrase so that the results may be reviewed at a later time. For instance, as is described in greater detail below, a call center administrator may review the results at a later time to attempt to identify one or more training topics to be associated with the keyword or phrase.

However, if instead the analytics module 520 determines one or more training topics were identified for the keyword or phrase, the analytics module 520 retains the identified training topics and determines in operation 745 whether results remain for another keyword or phrase. If so, the analytics module 520 returns to operation 715 and reads the results for the next keyword or phrase. At this point, the analytics module 520 repeats the operations already described for the next keyword or phrase in the analytics results.

Once the analytics module 520 has completed evaluating all of the analytics results, the analytics module 520 returns the identified training topics to the automatic agent selection module 481 in operation 750 so that the automatic agent selection module 481 can identify agents and schedule the agents to receive training on the identified training topics. Thus, returning to the example, the analytics module 520 may query the profiles stored in one or more of the training topic profile databases and may find one profile that has the keyphrase "first-time homeowner tax credit" related to the profile. In this instance, the profile may be for the training topic "advising clients on eligibility for the first-time homebuyer tax credit." This topic is returned to the automatic agent selection module 481 and the module 481 identifies agents to schedule training on this topic. As a result of this process, in various embodiments, the call center is able to better address the training needs of its agents by providing training on topics that agents are frequently addressing during communications with clients/customers.

Training Topic Management Tools

The training topic management tools 496 facilitate various activities related to identifying, modifying, and managing training topics (including specific training courses) and associated keywords and phrases. For instance, in various embodiments, the training topic management tools 496 allow the administrator to create, modify, or edit parameters associated with a particular training topic and/or keyword or phrase. For example, in particular embodiments, the tools 496 allow the administrator to assign one or more training topics to a particular keyword or phrase that has been identified as being of interest. In addition, in particular embodiments, the tools 496 allow the administrator to create, modify, or edit one or more rules comprising thresholds for signaling occurrences of the keywords and/or phrases that identify when the training topic should be presented to agents. All these training topic-related aspects may be defined in various embodiments by the administrator using the training topic management tools 496 comprising various well-known GUI mechanisms.

Figure 8:
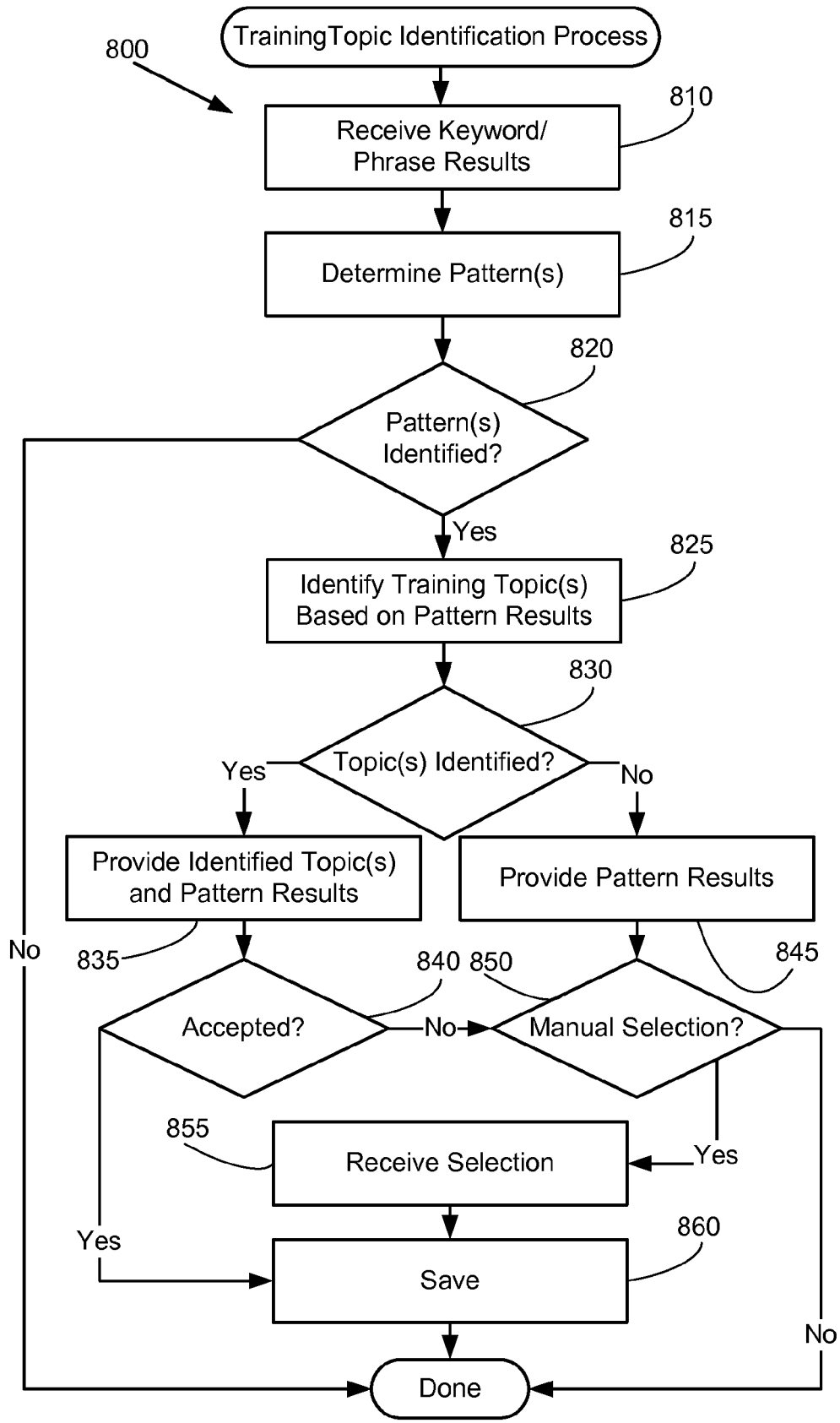
FIG. 8 is a flowchart illustrating a training topic identification process in accordance with various embodiments of the present invention.

As mentioned, in particular instances, the analytics results may include identified keywords and/or phrases of interest that are not related to any specific training topics. In these particular instances, the results may be saved so that they may be reviewed at a later time and associated with training topics. Thus, FIG. 8 provides a process flow 800 according to one embodiment for identifying training topics in such instances. For this particular embodiment, the training topic management tools 496 are configured to provide suggested training topics for a particular keyword or phrase of interest.

Therefore, the process 800 begins in operation 810 with the training topic management tools 496 receiving the results for a particular keyword or phrase. As previously mentioned, depending on the embodiment, the results may include different information with respect to the keyword or phrase. For instance, in particular embodiments, the results include information on each communication involving the keyword or phrase and the agent involved in the communication.

At this point, in operation 815, the training topic management tools 496 attempts to determine one or more patterns in how these communications were handled. For instance, in particular embodiments, the training topic management tools 496 may evaluate resolutions introduced by agents in fielding the communications that involved the keyword or phrase. That is, depending on the particular circumstances of a communication, the agent fielding the communication may provide the party with one or more resolutions to address a reason for the communication. For example, the agent may provide the party with one or more resolutions by providing one or more solutions to an issue the party is having, by providing the party with needed information, by collecting needed information from the party, by providing one or more services or products to the party, and so forth. Thus, in these particular embodiments, the training topic management tools 496 may evaluate the particular resolutions provided in these communications (e.g., a particular solution provided by agents in a number of communications involving the keyword or phrase of interest) to establish one or more patterns in how these communications were handled.

For instance, many call centers are configured to display information on an agent's workstation with respect to one or more resolutions the agent may be considering and/or providing to a party during the time the agent is fielding a telephone call. For example, in one particular instance, the agent may be advising a party on a particular product's features and the agent may query information on the features that is displayed on the agent's workstation so that the agent may reference the information. Thus, in various embodiments, the training topic management tools 496 may retrieve the information that was made available to or requested by agents in fielding the communications involving the particular keyword or phrase to attempt to establish one or more patterns in how these communications were handled.

Depending on the embodiment, this information may be stored along with the analytics results for the keyword or phrase or the training topic management tools 496 may query the information from one or more call center components. For example, in one embodiment, the training topic management tools 496 may use communication identities stored along with the results for the particular keyword or phrase of interest to query information used by the agents during the communications involved in the results from one or more data storage devices within the call center. From this information, the training topic management tools 496 may determine whether any patterns emerge from the agents' use of the queried information.

For example, turning to FIGS. 9A and 9B, the table shown in FIG. 9A comprises categories of information used by agents fielding telephone calls for a computer manufacturer in which parties had called the agents to seek help because they were experiencing "booting issues" (e.g., the identified keyphrase of interest) with their computer devices. In this example, the categories of information involve seven communications handled by seven different agents (e.g., agents 1 thru 7 in the Agent column 910) and the information is broken down into separate categories 920. In this instance, the separate categories involve information on procedures the agents had the parties perform to try to resolve the parties' booting issues. Category A is a procedure for reconfiguring the booting routine for the device. Category B is a procedure for resetting a listing parameter in the booting configuration. Category C is a procedure for powering the device off and on. Category D is a procedure for downloading a patch to the device to fix the booting issue. Category E is a procedure for replacing a driver used by the booting routine.

The table displays the order in which the agent had the party perform the different procedures related to the categories. That is, for any one communication, the agent had the party first perform the procedure in the first category column 930, had the party second perform the procedure in the second category column 940, had the party third perform the procedure in the third category column 950 if needed, and had the party fourth perform the procedure in the fourth category column 960 if needed. The second table in FIG. 6B shows the occurrences that each procedure was recommended to a party and the number of times each procedure was the last one recommended to a party. The thought being that the last procedure performed was likely the one to have solved the party's booting issue.

From the results in the second table, one can see that the procedure for Category B was recommended a total of six times 970 and on four occasions 980 it was the last procedure recommended to a party to perform to fix the party's booting issue. Therefore, in this example, the training topic management tools 496 determine a pattern exists of recommending that a party reset a listing parameter in the booting configuration to solve the party's booting issue. Further, the training topic management tools 496 may determine that a second pattern exists for also recommending downloading the patch to fix the booting issue. The training topic management tools 496 may make such a determination because on three occasions 990 this was the last procedure recommended to a party to perform to fix the party's booting issue.

Returning now to FIG. 8, in various embodiments, the training topic management tools 496 determine whether one or more patterns have been identified in operation 820. If none have been identified, the training topic management tools 496 simply exit. Depending on the embodiment, the training topic management tools 496 may indicate such to the user (e.g., to the call center administrator). For example, in one embodiment, the training topic management tools 496 may provide a message on the call center administrator's workstation informing him that no patterns could be determined from the communications involving the keyword or phrase and consequently no recommendations of training topics could be made.

However, if one or more patterns have been identified, in operation 825, the training topic management tools 496 identify training topics based on the pattern results. For instance, returning to the example, the training topic management tools 496 identify training topics that may be related to resetting a listing parameter in the booting configuration and/or to downloading the patch to fix the booting issue. That is, in this instance, the training topic management tools 496 may determine whether there are any training topics related to the two identified patterns. For example, the training topic management tools 496 may determine that a training topic is available on teaching agents how to advise customers on resetting the listing parameter in the booting configuration.

Thus, if the training topic management tools 496 determine one or more topics have been identified in operation 830, the training topic management tools 496 provides the identified training topics and pattern results to the call center administrator in operation 835. For instance, in one embodiment, the training topic management tools 496 provide the identified training topics and pattern results on one or more GUIs so that the call center administrator may review them.

At this point, the call center administrator may review the pattern results and training topics recommended by the training topic management tools 496 based on the pattern results. If the call center administrator is happy with the training topic management tools' 496 recommendation then the call center administrator accepts the recommendation. In turn, the training topic management tools 496 determine the call center administrator has accepted the recommendation in operation 840 and save the recommendation along with the keyword or phrase in operation 860.

However, if instead the call center administrator does not accept the training topic management tools' 496 recommendation or the training topic management tools 496 were unable to identify any training topics for the pattern results, in various embodiments, the call center administrator is provided the opportunity to manually select one or more training topics for the keyword or phrase of interest. For instance, in cases in which the training topic management tools 496 are unable to identify any training topics, the training topic management tools 496 in particular embodiments provide the pattern results in operation 845 to the call center administrator and alert the administrator that no training topics were identified for the pattern results. At this point, the call center administrator may review the pattern results and manually select one or more training topics to associate with the keyword or phrase based on his review of the pattern results.

For instance, returning to the example, the training topic management tools 496 may not identify the training topic for teaching agents how to advise customers on resetting the listing parameter in the booting configuration. However, the call center administrator may review the pattern results, look through the available training topics, and identify this training topic. Furthermore, the call center administrator may also identify a training topic for teaching agents on how to advise customers on downloading patches from the company's website. Therefore, in this instance, the call center administrator may select the two training topics and the training topic management tools 496 receive the selections in operation 855. Accordingly, the training topic management tools 496 save the selections so that the selections are associated with the keyword or phrase. That is, in the example, the training topic management tools 496 save the two training topics of teaching agents how to advise customers on resetting the listing parameter in the booting configuration and how to advise customers on downloading patches from the company's website so that the two training topics are associated with the keyphrase "booting issues."

At this point, the call center administrator may go through the manual agent selection process as detailed in the LMS application and select and schedule agents to receive training based on the training topics identified by the training topic management tools 496 and/or the call center administrator. In addition, by relating the training topics to the particular keyword or phrase, the next time the particular keyword or phrase is identified in analytics results as being of interest, in various embodiments, the automated process for identifying the associated training topics and identifying agents to be scheduled for training on the associated training topics may be utilized.

Workflow Manager

Once one or more particular training topics have been identified based on a set of analytics results and agents have been identified and scheduled to receive training on the particular training topics, the training for the topics is delivered to the agents. As previously mentioned, in various embodiments, the delivery of training content to the agents is facilitated by the workflow manager 480 as detailed in the LMS and IBTMS applications. That is, for instance, the operation of the workflow manager 480 in conjunction with delivering conventional training content is described in the LMS patent application and the operation of the workflow manager 480 in conjunction with delivering incentive-based training content is described in the IBTMS application.

Exemplary Computer Processing Device

Figure 10:
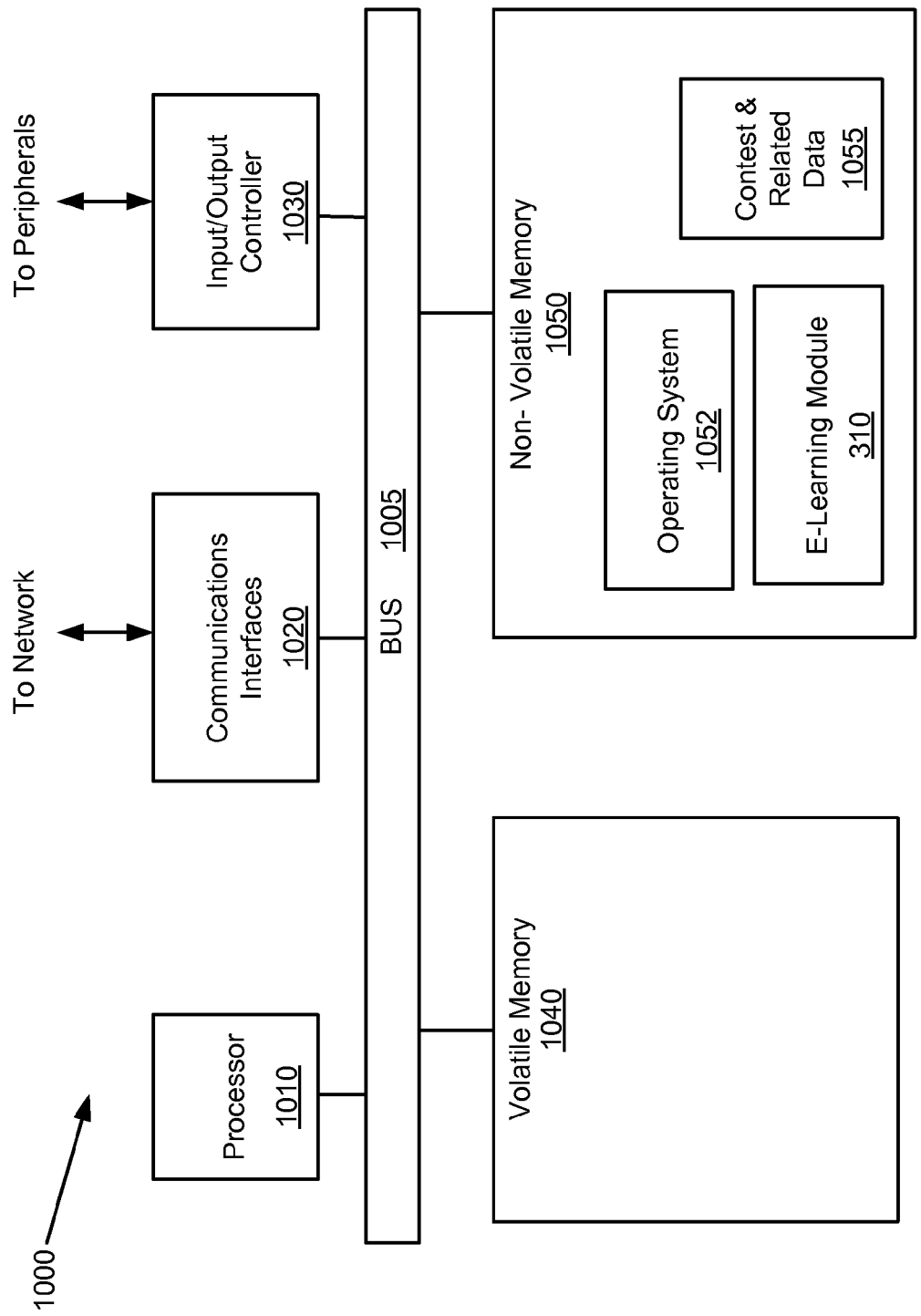
FIG. 10 is an exemplary schematic diagram of a processing device that can be used in various embodiments of the call center architecture to practice the technologies disclosed herein.

As discussed in conjunction with FIG. 1, the call center architecture 100 may comprise various components, such as a computer processing device, that comprise a processing system. FIG. 10 is an exemplary schematic diagram of a computer processing system that may be used in an embodiment of the call center architecture 100 to practice the technologies disclosed herein. FIG. 10 provides an exemplary schematic of a processing system 1000, which could represent individually or in combination, for example, the ACD 130, CTI server 145, WFM 155, e-learning system 156, or other components previously described. In general, the term "processing system" may be exemplified by, for example, but without limitation: a personal computer, server, desktop computer, tablet, smart phone, notebook, laptop, distributed system, server, blade, gateway, switch, and the like, as well as any combination of devices or entities adapted to perform the functions described herein. Depending on the embodiment, the e-learning module 310 may be incorporated into the e-learning system 156 or other call center component such as the WFM 155 and may augment the functionality typically found in an e-learning system 156 or a WFM 155.

As shown in FIG. 10, the processing system 1000 may include one or more processors 1010 that may communicate with other elements within the processing system 1000 via a bus 1005. The processor 1010 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1000 may also include one or more communications interfaces 1020 for communicating data via the local network 170 with various external devices, such as other systems described in FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1030 may also communicate with one or more input devices or peripherals using an interface 1035, such as, but not limited to: a keyboard, a mouse, a touch screen/display input, microphone, pointing device, etc. The input/output controller 1030 may also communicate with output devices or peripherals, such as displays, printers, speakers, headsets, banner displays, etc. These may be used, in part, to receive Administrator input, including for interacting with the manual agent selection module.

The processor 1010 may be configured to execute instructions stored in volatile memory 1040, non-volatile memory 1050, or other forms of computer readable storage media accessible to the processor 1010. The volatile memory 1040 may comprise various types of memory technologies, including, but not limited to: random access memory ("RAM"), dynamic random access memory ("DRAM"), static random access memory ("SRAM"), and other forms well known to those skilled in the art. The non-volatile memory 1750 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1050 may store program code and data, which also may be loaded into the volatile memory 1040 at execution time. Specifically, the non-volatile memory 1050 may store one or more program modules such as the e-learning module 310 (including the other above-referenced modules), for example, and/or operating system code 1052 containing instructions for performing the process and/or functions associated with the technologies disclosed herein. The e-learning module 310 may also access, generate, or store data 1055, including any of the data described above in conjunction with the training process, in the non-volatile memory 1050, as well as in the volatile memory 1040. The volatile memory 1040 and/or non-volatile memory 1050 may be used to store other information including, but not limited to: records, applications, programs, scripts, source code, object code, byte code, compiled code, interpreted code, machine code, executable instructions, or the like. These may be executed or processed by, for example, processor 1010. These may form a part of, or may interact with, the e-learning module 310.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

Conclusion

The logical operations described herein are implemented as a sequence of computer implemented acts or one or more program modules running on a computing system and/or as interconnected machine logic circuits or circuit modules within the computing system. The implementation is a matter of choice dependent on the performance and other requirements of the computing system. Accordingly, the logical operations described herein are referred to variously as states, operations, acts, or modules. These operations, acts, and modules may be implemented in software, in firmware, in special purpose digital logic, and any combination thereof. Greater or fewer operations may be performed than shown in the figures and described herein. These operations may also be performed in a different order than those described herein.

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for identifying a training topic for at least one agent at a contact center, the method comprising the steps of:
performing an analysis by at least one computer processor on an aggregate of communications conducted between multiple agents at the contact center and multiple contact parties over a time period, the analysis comprising identifying occurrences of a keyword or a keyphrase found in individual communications of the aggregate of communications conducted between the multiple agents and the multiple contact parties; and
in response to a total number for the occurrences of the keyword or the keyphrase over the time period being more than a predetermined threshold set for the aggregate of communications:
determining by the at least one computer processor a pattern for the individual communications in which occurrences of the keyword or the keyphrase are found, the pattern identifying one or more popular resolutions introduced by agents during the individual communications in which occurrences of the keyword or the keyphrase are found; and
identifying by the at least one computer processor the training topic based on the pattern, wherein the training topic is associated with at least one of the one or more popular resolutions introduced by the agents during the individual communications in which occurrences of the keyword or the keyphrase are found, and the at least one of the one or more popular resolutions is a resolution offered more often last during the individual communications in which occurrences of the keyword or the keyphrase were found.

2. The method of claim 1, wherein the communications comprise one or more of telephone calls, text messages, emails, and Web chats.

3. The method of claim 1, wherein the total number for the occurrences of the keyword or the keyphrase over the time period comprises a number of the individual communications in which occurrences of the keyword or the keyphrase are found involving a predetermined number of different agents at the contact center.

4. The method of claim 1 further comprising the steps of:
automatically identifying by the at least one computer processor one or more agents at the contact center for scheduling training on the identified training topic;
automatically scheduling by the at least one computer processor the one or more agents to receive training on the identified training topic during one or more training sessions; and
delivering training content identified by the training topic to the one or more agents during the one or more training sessions.

5. The method of claim 4, wherein at least one of the one or more agents to receive training on the identified topic is not one of the multiple agents involved in the individual communications in which occurrences of the keyword or the keyphrase are found.

6. A non-transitory computer-readable storage medium for identifying a training topic for at least one agent at a contact center, the tangible computer-readable storage medium comprising computer-executable instructions when executed by at least one computer processor cause the at least one computer processor to:
perform an analysis on an aggregate of communications conducted between multiple agents at the contact center and multiple contact parties over a time period, the analysis comprising identifying occurrences of a keyword or a keyphrase found in individual communications between the multiple agents and the multiple contact parties; and
in response to a total number of the occurrences of the keyword or the keyphrase over the time period being more than a predetermined threshold set for the aggregate of communications:
determining a pattern for the individual communications in which occurrences of the keyword or the keyphrase are found, the pattern identifying one or more popular resolutions introduced by agents during the individual communications in which occurrences of the keyword or the keyphrase are found; and
identifying the training topic based on the pattern, wherein the training topic is associated with at least one of the one or more popular resolutions introduced by the agents during the individual communications in which occurrences of the keyword or the keyphrase are found, and the at least one of the one or more popular resolutions is a resolution offered more often last during the individual communications in which occurrences of the keyword or the keyphrase were found.

7. The non-transitory computer-readable storage medium of claim 6, wherein the communications comprise one or more of telephone calls, text messages, emails, and Web chats.

8. The non-transitory computer-readable storage medium of claim 6, wherein the total number for the occurrences of the keyword or the keyphrase over the time period comprises a number of the individual communications in which occurrences of the keyword or the keyphrase are found over the time period involving a predetermined number of different agents at the contact center.

9. The non-transitory computer-readable storage medium of claim 6, wherein the computer-executable instructions when executed by the at least one computer processor cause the at least one computer processor to:
  identify one or more agents at the contact center for scheduling training on the identified training topic; and
  schedule the one or more agents to receive training on the identified training topic during one or more training sessions, wherein the training content identified by the training topic is delivered to the one or more agents during the one or more training sessions.

10. The non-transitory computer-readable storage medium of claim 9, wherein at least one of the one or more agents to receive training on the identified topic is not one of the multiple agents involved in the individual communications in which occurrences of the keyword or the keyphrase are found.

11. A system for identifying a training topic for at least one agent at a contact center, the system comprising:
  at least one computer processor configured to:
    perform an analysis on an aggregate of communications conducted between the multiple agents at the contact center and multiple contact parties over a time period, the analysis comprising identifying occurrences of a keyword or a keyphrase found in individual communications of the aggregate communications conducted between the multiple agents and the multiple contact parties; and
    in response to a total number of the occurrences of the keyword or the keyphrase over the time period being more than a predetermined threshold set for the aggregate of communications:
      determine a pattern for the individual communications in which occurrences of the keyword or the keyphrase are found, the pattern identifying one or more popular resolutions introduced by agents during the individual communications in which occurrences of the keyword or the keyphrase are found; and
      identify the training topic based on the pattern, wherein the training topic is associated with at least one of the one or more popular resolutions introduced by the agents during the individual communications in which occurrences of the keyword or the keyphrase are found, and the at least one of the one or more popular resolutions is a resolution offered more often last during the individual communications in which occurrences of the keyword or the keyphrase were found.

12. The system of claim 11, wherein the communications comprise one or more of telephone calls, text messages, emails, and Web chats.

13. The system of claim 11, wherein the total number for the occurrences of the keyword or the keyphrase over the time period comprises a number of the individual communications in which occurrences of the keyword or the keyphrase found in the communications over the time period for a predetermined number of different agents at the contact center.

14. The system of claim 11, wherein the at least one computer processor is configured to:
  identify one or more agents at the contact center for scheduling training on the identified training topic; and
  schedule the one or more agents to receive training on the identified training topic during one or more training sessions, wherein training content identified by the training topic is delivered to the one or more agents during the one or more training sessions.

15. The system of claim 14, wherein at least one of the one or more agents to receive training on the identified topic is not one of the multiple agents involved in the individual communications in which occurrences of the keyword or the keyphrase are found.

* * * * *